April 14, 1942.  R. S. HOPKINS  2,279,463

FILM HANDLING APPARATUS

Filed Dec. 27, 1939  3 Sheets-Sheet 1

Roy S. Hopkins
INVENTOR

BY Newton N. Perrins
George A. Gillette Jr.
ATTORNEYS

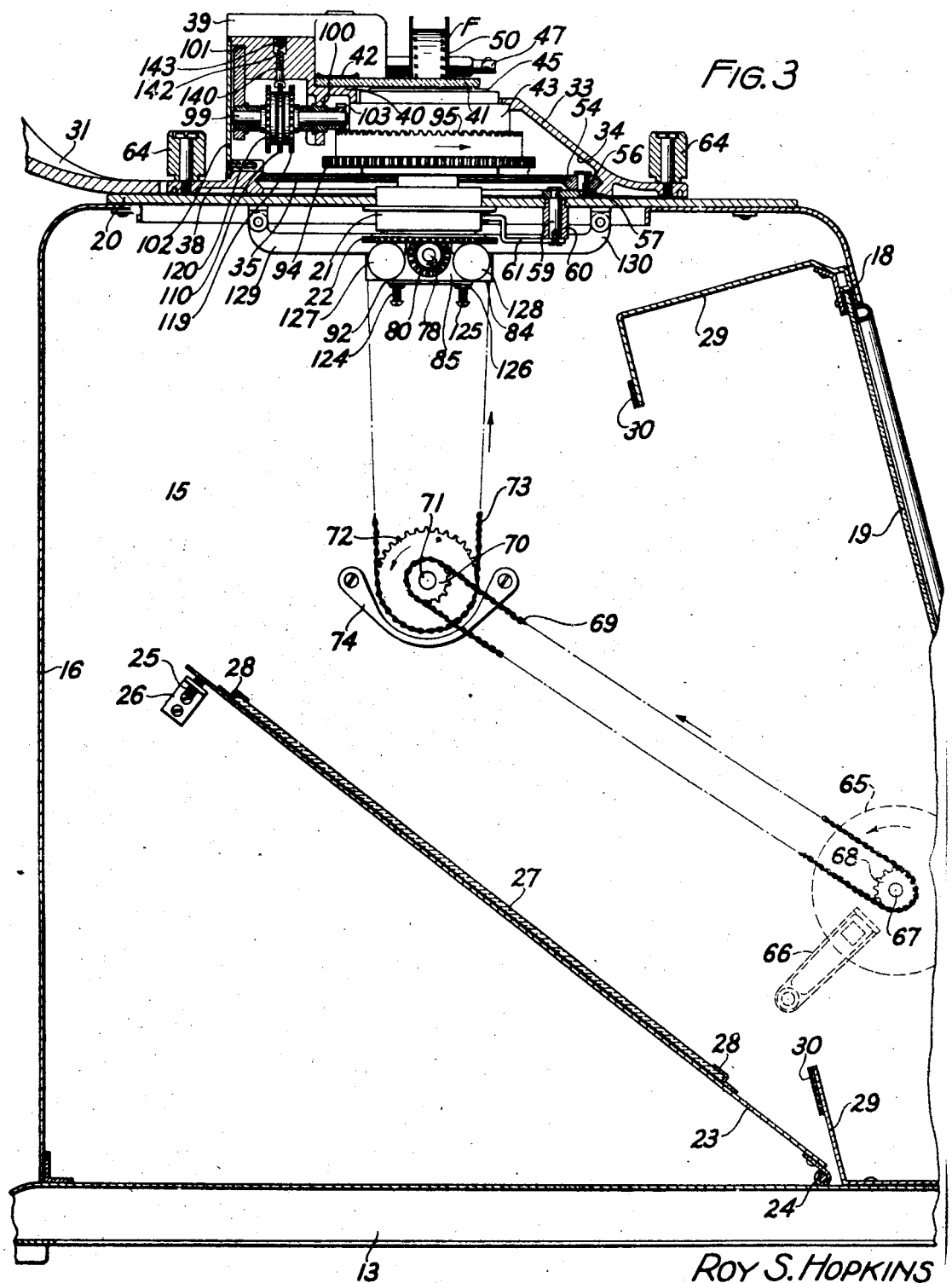

April 14, 1942.　　　R. S. HOPKINS　　　2,279,463
FILM HANDLING APPARATUS
Filed Dec. 27, 1939　　　3 Sheets-Sheet 3
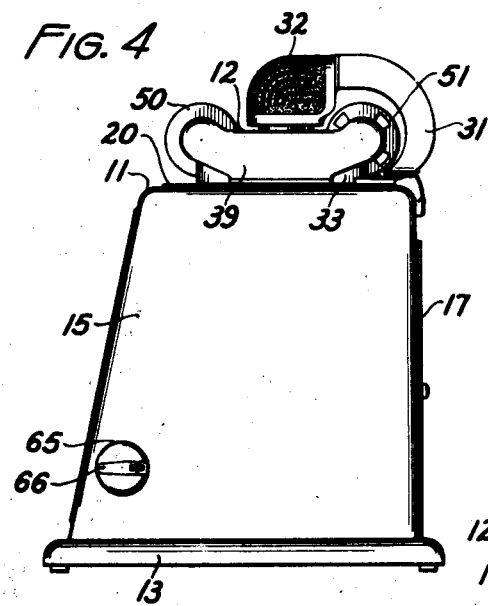
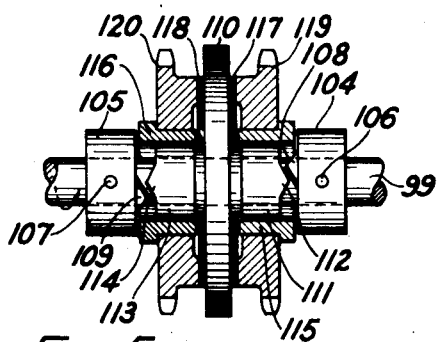
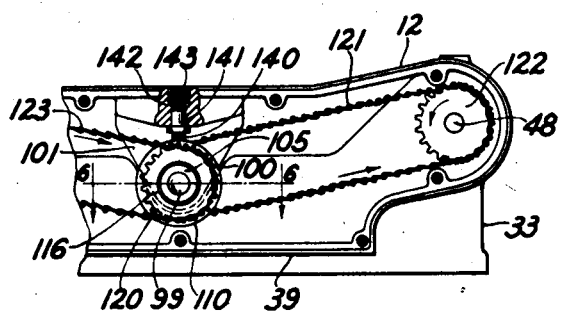
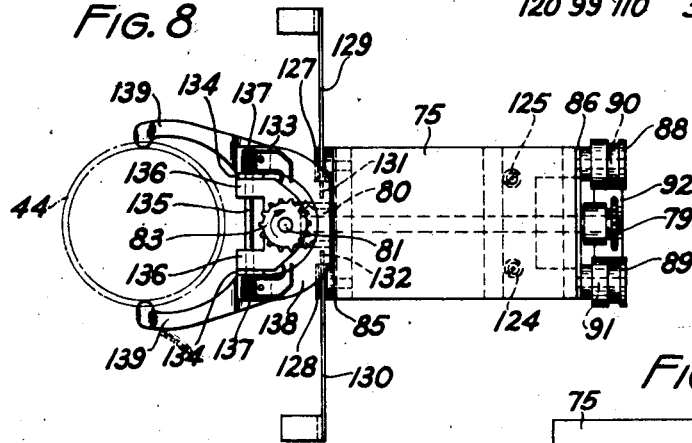
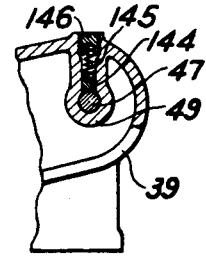
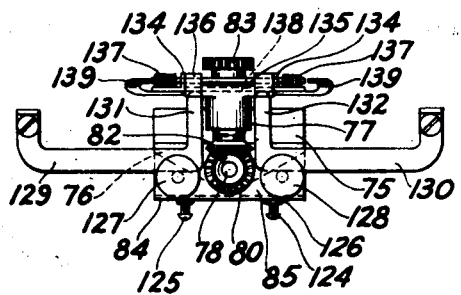
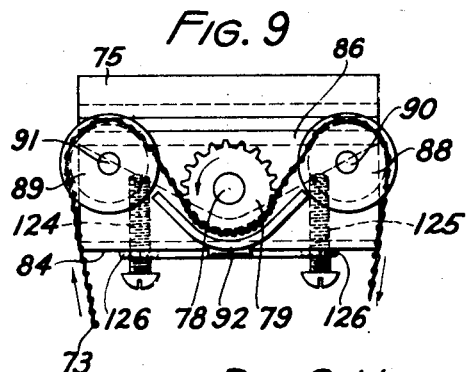
Roy S. Hopkins
INVENTOR
BY
ATTORNEYS Patented Apr. 14, 1942

2,279,463

UNITED STATES PATENT OFFICE 2,279,463

FILM HANDLING APPARATUS

Roy S. Hopkins, Rochester, N. Y., assignor to Eastman Kodak Company, Rochester, N. Y., a corporation of New Jersey Application December 27, 1939, Serial No. 311,177

20 Claims. (Cl. 88—24)

The present invention relates to a film handling apparatus and more particularly to arrangements for moving a film strip through a film gate on the rotatable head of a photographic projector.

The primary object of the present invention is the provision of a film handling apparatus having a rotatable film supporting head and a winding means partially on said head and partially on the casing of the apparatus so that film may be advanced through the head from the winding member on the casing, having a gate opening means including a rockable cradle operatively connected to a movable gate member which is opened automatically by movement of the winding means prior to advancement of film through the head, having a friction drag means engaging elements of the winding means on the head for rendering the resistance to movement of the winding means elements on the head greater than the resistance to movement of the winding means elements on the casing and greater than the resistance to rocking of said cradle, and having a detent means between said head and said casing for positioning the head in any one of several predetermined positions and for overcoming the tendency of said winding means to rotate said head.

Another object of the invention is the provision of a film handling apparatus comprising a casing, a film supporting head rotatably mounted on said casing, and a winding means including a rotatable driven member on said head and a driving member on the casing for rotating said driven member.

A further object of the invention is the provision of a gate opening means comprising a cradle rotatable on a shaft of the winding means for movement of a movable gate member to open the same and comprising a pair of idler supports for maintaining an endless drive member without appreciable slack in engagement with a driven member on said shaft so that said cradle is rocked by movement of the winding means or said endless drive member.

Still another object of the invention is the provision of a friction drag means engaging the winding means elements on the head for rendering the resistance to movement of the elements of the winding means on the head and of the film greater than the resistance to movement of the winding means elements on the casing so that upon rotation of the head the film at the gate remains stationary while the winding means elements on the casing may be moved.

A still further object of the invention is the provision of a detent means between the rotatable film supporting head and the casing for positioning the head in any one of a plurality of positions with respect to said casing and for overcoming the tendency of the winding means to rotate said film supporting head.

Other and further objects of the invention will be suggested to those skilled in the art by the description which follows.

Reference is hereby made to the accompanying drawings wherein like reference characters designate similar elements and wherein:

Fig. 3 is a vertical longitudinal cross section of the film handling apparatus according to the invention and as taken on the line 3—3 of Fig. 1.

Fig. 4 is a side elevation of my improved film handling apparatus.

Fig. 5 is a fragmentary rear view of the film supporting head with the cover plate removed and showing the connections to the spindles on the head.

Fig. 6 is a section to enlarged scale of the clutch member for driving the reel spindles and taken on the line 6—6 of Fig. 5.

Fig. 7 is a fragmentary vertical section through the spindle journal of the head and taken on the line 7—7 of Fig. 1.

Fig. 8 is a plan view of the rockable cradle of the gate opening means and intermediate connections to the movable gate member.

Fig. 9 is an end view of the rockable cradle showing the endless chain drive to its supporting shaft; and Fig. 10 is an end view of the opposite end of said cradle and also showing the intermediate connections to the movable gate member.

Figure 1:
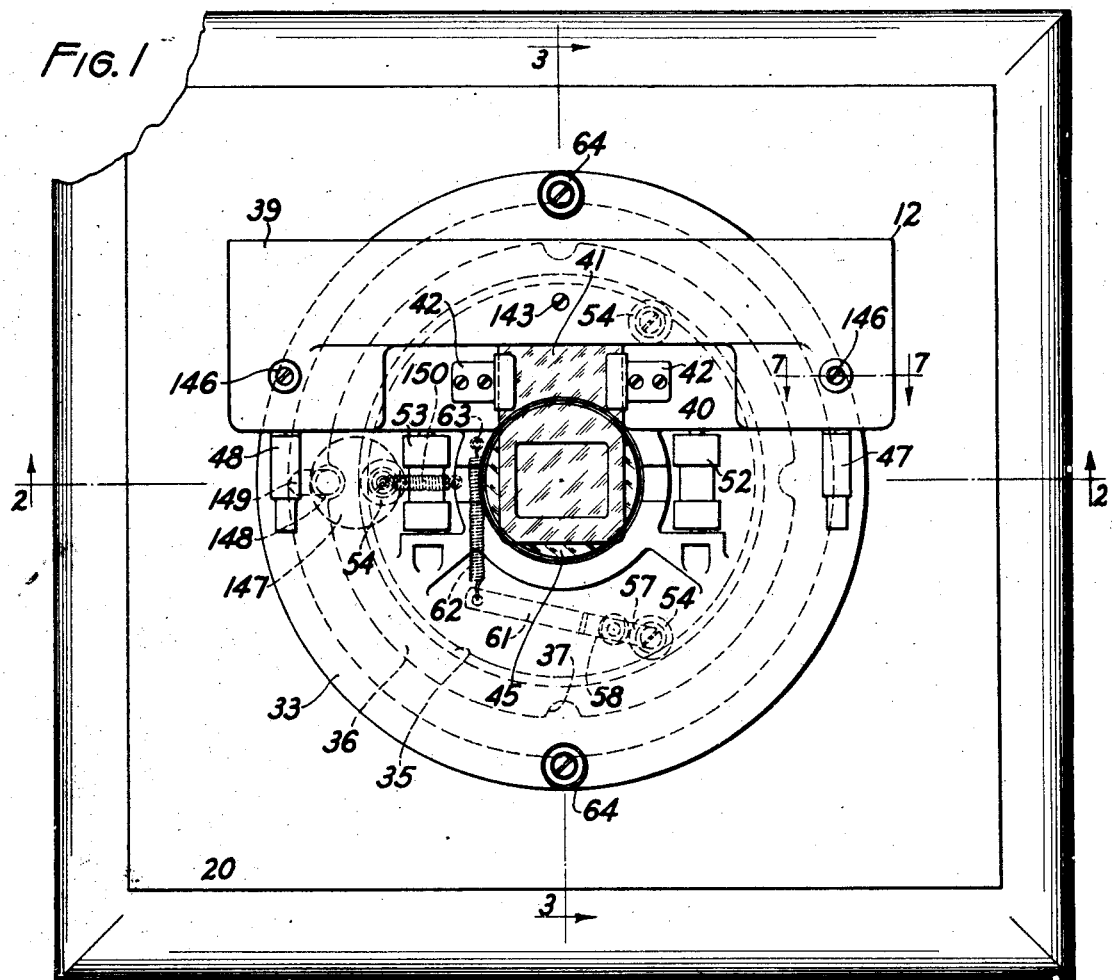
Fig. 1 is a plan view of the top only of a film handling apparatus having a rotatable film supporting head according to the invention.

Although the present disclosure relates to a photographic projector, it shall be understood that this invention may also be applied to any type of film handling apparatus. In the illustrated embodiment of the invention, the film handling apparatus comprises a casing 11 and a rotatable film supporting head 12.

Said casing 11 comprises a base 13, side walls 14 and 15, a rear wall 16 part of which is swingably mounted on the hinge 17, see Fig. 4, and a front wall 18 which is provided with an opening for a translucent screen member 19. A top wall or plate 20 is riveted to the top of the casing 11 and carries an objective member 21 including a focusing sprocket 22.

An internal plate 23, see Fig. 3, is swingably mounted on base 13 by a hinge 24 and is supported in the inclined position shown by set screws 25 in brackets 26 on side walls 14 and 15. A mirror 27 is mounted on plate 23 by clips 28 and functions to reflect the image received from objective member 21 onto the translucent screen member 19. A light baffling frame 29 is mounted within casing 11 adjacent the front wall 18 and internal plate 23 may be swung against pads 30 on frame 29 to shield the interior of the casing from any light entering through the screen member 19. Under these conditions, the projecting apparatus may be used as a projection enlarger by merely laying sensitive paper or a printing frame on the base 13, the hinged rear wall 16 providing access to the interior of the casing 11.

A curved bracket 31 is fastened to top wall 20 and supports a lamp house 32 which contains the usual light source and condensers, not shown, for directing a beam of light downwardly into the objective member 21.

The film supporting head 12 comprises a circular cap-like frame 33 provided with an internal cavity 34 and provided with an internal, annular V-shaped groove 35. Said frame 33 has a circular flange 36 which is provided with notches 37 located in quadrature and said frame 33 is provided with an annular recess 38 adjacent said circular flange 36.

A winding means housing 39 is mounted on frame 33 and includes a ledge 40 on which a stationary gate member or glass flat 41 is mounted by a pair of clips 42. A cylindrical sleeve 43 is fastened within the cavity 34 of frame 33 and forms a guideway for the movable gate member which is composed of a cylindrical barrel 44 axially slidable within sleeve 43 and carrying a glass flat 45 fastened to one end of barrel 44 by clips 46.

Spindles 47 and 48 are rotatably mounted in respective ends of the housing 39 being preferably journaled within bearings 49 formed integrally with housing 39, see Fig. 7. Film holders such as film reels 50 and 51 may be positioned respectively upon spindles 47 and 48 and the intervening film strip F passes between the glass flats 41 and 45 forming the stationary and movable gate members. A guide roller 52 is rotatably mounted in frame 33 between spindle 47 and the film gate and a second guide roller 53 is rotatably mounted in frame 33 between the film gate and spindle 48. These guide rollers may be centrally recessed for guiding a narrower width of film, such as 16 mm. film through the film gate.

Figure 2:
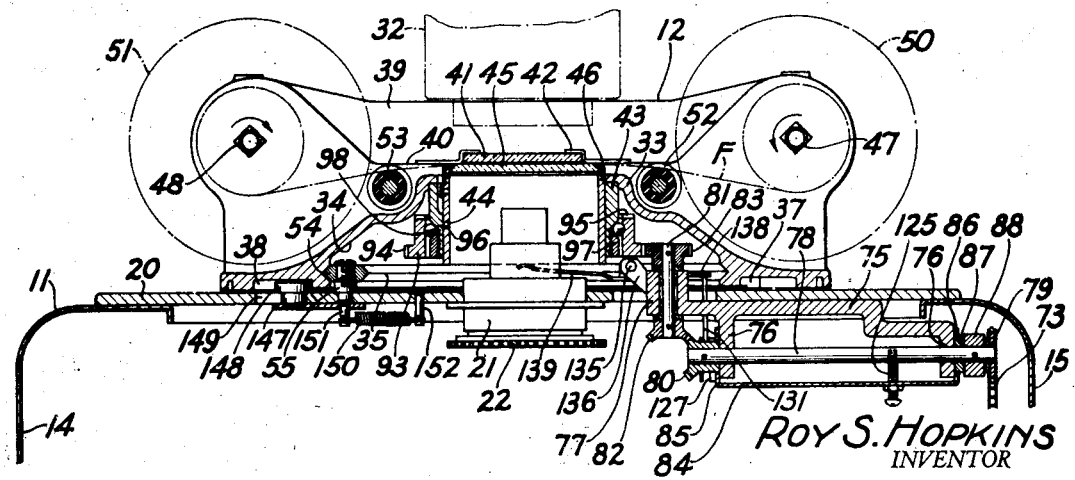
Fig. 2 is a fragmentary vertical section through said film supporting head and taken on the line 2—2 of Fig. 1.

Since the objective member 21 is mounted on casing 11 or the top wall 20 thereof and since the film gate or glass flats 41 and 45 are mounted on the film supporting head 12, it is extremely important that the mounting means for rotatably supporting the film head 12 shall accurately support said head 12 so that the stationary glass flat 41 or guiding surface thereof will place the supported film strip F in the focal plane of the objective member 21. To this end the film head 12 is provided with an internal annular groove having a contour complementary in shape to the peripheries of rollers on said top wall 20. A plurality of rollers 54 having V-shaped peripheries are rotatably mounted on top wall 20. Two of said rollers 54, see Figs. 1 and 2, are rotatably mounted on studs 55 fastened to top wall 20. Another of rollers 54, see Figs. 1 and 3, is rotatably mounted on a stud 56 fastened to an arm 57 of a bell crank 58, said bell crank 58 also comprising a spindle 59 journaled in a bushing 60 on plate 20 and an arm 61 fastened to the other end of spindle 59. A spring 62 is connected between the outer end of arm 61 and a pin 63 on top wall 20. It is now clear that the spring 62 tends to move the bell crank 58 so that the roller 54 on arm 57 thereof is moved outwardly into engagement with the V-shaped groove 35 in cap-like frame 33. This outward pressure on one of the rollers 54 tends to center the V-shaped peripheries of all of the rollers 54 with respect to the V-shaped groove 35 in frame 33. As a result, said frame 33 and the stationary gate member or glass flat 41 thereon are accurately located with respect to objective member 21 and the film held between the glass flats 41 and 45 is accurately located in the focal plane of objective member 21. Such accurate location of the film F with respect to objective member 21 is obtained, although the film supporting head 12 may be rotated to any desired position by means of the knobs 64 on said cap-like frame 33. It will also be noted that the mounting means or rollers 54 and groove 35 are arranged, respectively, on top wall 20 and in cap-like frame 33 so that the film supporting head 12 is rotatable concentrically of objective member 21 or so that the axis of rotation of head 12 coincides with the optical axis of the objective member 21.

The film winding means comprises one or more driving elements on the casing and a plurality of driven elements on the rotatable film supporting head 12. The winding means elements on the casing may comprise a winding member 65 carrying a crank handle 66 and mounted externally of casing 11, see Fig. 4, on one end of shaft 67 which is journaled in the side wall 15 of casing 11. The crank handle 66 may be hinged to winding member 65 so that it can be folded into the compact position shown in Fig. 4 or so that it can be swung into the winding position indicated by the dotted lines in Fig. 3. A sprocket 68 is mounted on the inner end of shaft 67 within casing 11 and engages a chain 69 encircling a sprocket 70 on a shaft 71 journaled in the side wall 15. A larger sprocket 72 is also mounted on shaft 71 and is encircled by an endless drive member or chain 73. A guard 74 is mounted on side wall 15 adjacent the periphery of the large sprocket 72 to hold the chain 73 thereon.

A bracket 75 is fastened to the underside of top wall 20 and includes bearing lugs 76 and a sleeve 77. A shaft 78 is rotatably supported in bearing lugs 76, carries on one end a sprocket 79 and on the other end a miter gear 80. A stub shaft 81 is journaled in the sleeve 77 of bracket 75, carries on its lower end a miter gear 82 in mesh with miter gear 80 and carries on its upper end a pinion gear 83.

A gate opening means comprises a cradle 84 having an end plate 85 and an end plate 86. Said end plate 85 is provided with an opening for rotatably encircling the base of miter gear 80, while end plate 86 encircles a bushing 87 which is freely rotatable on the shaft 78. A pair of idler supports are mounted in the end of cradle 84 on opposite sides of shaft 78 and maintain the endless drive member 73 in engagement with the sprocket 79 without permitting appreciable slack in the endless drive member or chain 73. Such idler supports comprise grooved rollers 88 and 89, grooved roller 88 being freely rotatable on a pin 90 extending from end plate 86 of cradle 84 and grooved roller 89 being freely rotatable on a pin 91 also extending from end plate 86 but on the opposite side of shaft 78 from the pin 90. A guard plate 92, see Fig. 9, is mounted on cradle 84 and has an arcuate portion adjacent the periphery of sprocket 79 to hold the endless chain 73 thereon. Thus it will be seen that upon rotation of the winding member 65 by crank handle 66, the shaft 67, chain 69 and sprocket 70 will be rotated. In turn, large sprocket 72, endless drive or chain 73, sprocket 79, shaft 78, miter gear 80, miter gear 82, shaft 81, and pinion gear 83 will also be rotated. The elements just enumerated constitute the elements of a winding means upon the casing 11 of the apparatus.

The winding means elements on the film supporting head comprise a rotatable ring member, a clutch member and driving connections from said clutch members to the spindles 47 and 48. The ring member, see Figs. 2 and 3, is rotatably mounted upon the cylindrical sleeve 43 of the frame 33. Said ring member 93 is annular in form, has a toothed periphery 94 for meshing with the pinion gear 83, and has crown gear teeth 95. Practically frictionless mounting of the ring member 93 may be obtained by providing a ballbearing groove or race internally of ring member 93 and by providing a ballbearing mounting between said ring member 93 and the cylindrical sleeve 43. An external annular groove 96, see Fig. 2, is provided in cylindrical sleeve 43 and has one side formed by the beveled edge of a sleeve 97 which is threaded onto a reduced portion of cylindrical sleeve 43. An internal annular groove is formed on the inner wall of the ring member 93 and together with groove 96 forms a race for the ballbearings 98. Thus the ring member 93 is freely rotatable on said sleeve 43 of the frame 33 of the film supporting head 12 and by reason of the threaded sleeve 97, such ballbearing mounting for the ring member 93 may be readily assembled.

A clutch shaft 99 is rotatably mounted in the bearing plates 100 and 101 within the housing 39 which is hollow but enclosed by a cover plate 102, see Fig. 3. A pinion gear 103 is mounted on one end of clutch shaft 99 and meshes with the crown gear 95 of ring member 93. Rotation of said clutch shaft 99 is transmitted to either of the spindles 47 and 48 through a clutch assembly now to be described.

The clutch assembly is best illustrated in Fig. 6 and comprises a pair of collars 104 and 105 which are fastened, respectively, to shaft 99 by pins 106 and 107. A pair of beveled teeth 108 are oppositely arranged on collar 104 and a pair of similar beveled teeth 109 are provided on collar 105. Said teeth 108 and 109 are angularly displaced with respect to each other for a purpose which will be presently apparent. A disk member 110 floats on shaft 99 and includes a collar 111 carrying a pair of beveled teeth 112 and a collar 113 carrying a pair of beveled teeth 114. Said beveled teeth 112 and 114 are in axial alignment with respect to each other and are within the angle of displacement of the teeth 108 and 109 on the respective collars 104 and 105. A sleeve 115 fits freely over collar 111 and a corresponding sleeve 116 is mounted upon the collar 113. Friction disks 117 and 118 are mounted, respectively, on undercut portions on each side of the disk 110. Sprocket collars 119 and 120 are, respectively, mounted upon reduced portions of the sleeves 115 and 116. The clearances between the ends of sleeve 115 and collar 104 and friction disk 117 and between the ends of sleeve 116 and the corresponding collar 105 and friction disk 118 are less than the axial displacement imparted to the disk member 110 either by engagement of teeth 108 with the beveled teeth 112 or of teeth 109 with beveled teeth 114.

Driving connections between the clutch member and the respective spindles 47 and 48 may be provided in a conventional manner. An endless chain 121, see Fig. 5, encircles the inner sprocket collar 119 and also encircles a sprocket 122 on the end of the spindle 48 which is rotatably mounted within the winding means housing 39. In a similar manner a chain 123 encircles and engages the teeth of sprocket collar 120 and a sprocket, not shown, on the spindle 47 which is rotatably mounted in the integral bearings of housing 39.

The operation of the complete winding means including the elements on the casing and the elements on the head will now be described. When the winding member 65 is rotated by a crank handle 66 in a counter-clockwise direction as indicated by the arrow of Fig. 3, the sprocket 68, chain 69 and sprockets 70 and 72 are also rotated in a counter-clockwise direction. At the same time the endless drive member or chain 73 is moved in the direction indicated by the arrow of Figs. 3 and 9 so that sprocket 79, shaft 78 and miter gear 80 are rotated in a clockwise direction as indicated in Fig. 3. Thus the miter gear 82, stub shaft 81 and pinion gear 83 are rotated in a clockwise direction as viewed from Fig. 8 and by virtue of the engagement between pinion gear 83 and the toothed periphery 94, the ring member 93 is rotated in the direction of the arrow thereon in Fig. 3. By reason of the engagement between crown gear 95 and pinion gear 103 the shaft 99 is rotated in a counter-clockwise direction as indicated in Figs. 5 and 6 and the teeth 109 of collar 105 engage the teeth 114 to move the disk member 110 axially or to the right as viewed in Fig. 6. Such axial movement of the disk member 110 moves the sleeve 115 against collar 104 and clamps the sprocket collar 119 between the rim of said sleeve 115 and the friction disk 117 while sprocket collar 120 may rotate freely on its supporting sleeve 116. Thus the movement of shaft 99 is transmitted through the clutch member to the sprocket collar 119 and moves the chain 121 and the sprocket 122 in the direction of the arrows shown in Fig. 5. Since Fig. 5 is a rear view of the driving connection to spindle 48, counter-clockwise rotation of sprocket 122 as shown in Fig. 5 will result in clockwise rotation of the spindle 48 as viewed in Fig. 2. As a result, upon such clockwise movement of the winding member 65, the film F will be moved to the left of Fig. 2 and wound upon the film reel 51 on spindle 48.

Conversely, when the winding member 65 is rotated in the opposite direction all of the winding elements including shaft 99 will also be moved in opposite directions. This reverse rotation of the shaft 99 will cause the sprocket collar 120 to be clamped for rotation therewith and the chain 123 will be driven by a sprocket collar 120 in the direction indicated by the arrow in Fig. 5 and the spindle 47 will be rotated in a counter-clockwise direction as viewed from Fig.

2. It will be noted that the lost motion in the clutch member can be reduced to a minimum by arranging the angular displacement of the teeth 108 and 109 so that upon opposite rotations of the shaft 99 the respective teeth 112 and 114 are immediately engaged and the clearances between sleeves 115 and 116 and respective collars 104 and 105 being less than the axial displacement of the clutch disk member 110 by said teeth 108 and 109 also reduces the lost motion in the clutch member.

The rockable cradle 84 of the gate opening means carries a pair of abutments for limiting the angular movement of said cradle 84. Such abutments may be conveniently provided as screws 124 and 125 threaded into said cradle 84 and fastened in adjusted positions by lock nuts 126. The upper ends of said screws 124 and 125 are adapted to strike against the bracket 75 when the cradle 84 has been rocked to its limit in either direction. Such rocking of the cradle 84 is utilized to separate the film gate members or to move the glass flat 45 away from the glass flat 41.

For this purpose intermediate means may be provided between said cradle 84 and the movable gate member or cylindrical barrel 44. Slotted disks 127 and 128 are fastened to the end plate 85 of cradle 84. Levers 129 and 130 are pivotally mounted from lugs on top wall 20, have upright arms 131 and 132 and lie, respectively, in the slots of disks 127 and 128. A fork member 133 has ears 134 and is pivotally mounted over top wall 20 by means of a spindle 135 which passes through said ears 134 and lugs 136 extending from the sleeve 77 of bracket 75. Coil springs 137 encircle each end of the spindle 135, each have one end engaged under the lugs 136 and each have one end bearing upon the circular portion 138 of fork member 133, see Fig. 8. The other side of fork member 133 includes fork arms 139 which extend around each side of the objective member 21 and which engage the lower edge of cylindrical barrel 44. The action of coil springs 137 normally moves said fork member 133 so that the fork arms 139 raise the cylindrical barrel 44 and resiliently press glass flat 45 against glass flat 41 or against the film strip F therebetween.

When the winding means elements on the casing are operated the endless drive member or chain 73, passing over the grooved rollers 88 and 89 on the cradle 84, causes said cradle 84 to rock in a direction corresponding to the direction of movement of said winding means elements. For instance, rotation of the winding member 65 causes movement of chain 73 in the direction of the arrow on Fig. 3 and tension in the lefthand strand of chain 73 will act downwardly on the grooved roller 88 to cause said cradle 84 to rock in a counter-clockwise direction with respect to Fig. 3. Such rocking of the cradle 84 raises the slotted disk 128 and moves the lever 130 so that the upright arm 132 thereof engages the circular portion 138 of fork member 133 to raise the same against the action of the coil springs 137. This raising of the circular portion 138 of fork member 133 lowers the fork arms 139 and permits the cylindrical barrel 44 and glass flat 45 thereon to fall away from the stationary glass flat 41 or the film F therebetween. Accordingly, the glass flats 41 and 45 are automatically separated so that the film may be moved therebetween without abrasion.

The frictional resistance to movement of the winding means elements from the sprocket 79 to the spindles 47 or 48 is considerably greater than the frictional resistance to rocking of the cradle 84. Consequently, the initial tension on either strand of chain 73 will cause the cradle 84 to rock until either of the abutments or screws 124 or 125 strike the bracket 75 and then only will the tension in chain 73 be sufficient to rotate the sprocket 79 and the other elements of the winding means connecting to the spindles. It is now apparent that adjustment of the abutments or screws 124 and 125 will determine the amount of lag between opening of the gate members and actual movement of film therebetween. It is obvious that the adjustment of said abutments should be such that the glass flats have been opened sufficiently to release the film before the film is moved longitudinally by either of the spindles 47 or 48 or film holders 50 or 51. The guide rollers 52 and 53 support the film so that it is normally a slight distance below the stationary glass flat 41 and so that during winding of the film F neither of the glass flats touches the sensitive surfaces of the film.

While it is recognized that automatic gate opening means including a rockable cradle arm are known, such previous means have been open to the objection that the endless chain member is quite slack so that the links of the chain become kinked or so that the slack side of the chain overlies the sprocket teeth to produce picking therebetween. According to the present arrangement the grooved rollers 88 and 89 support the endless drive member or chain 73 without any appreciable slack therein so that the previous objections or kinking of the slack side of the chain have been overcome.

When the film supporting head 12 is rotated with respect to the casing, it may happen that the frictional resistance to movement of the winding means elements on the casing is greater than the frictional resistance to movement of the winding means elements on the head. In such event rotation of the film supporting head would cause the pinion gear 103 to rotate on the crown gear 95 of ring member 93 and in turn one of the spindles 47 or 48 would be rotated to move or to tend to move the film strip F with respect to the glass flats 41 and 45. Under these circumstances the glass flats would not be opened and the film would be scratched. Furthermore, the film would be moved with respect to the gate and it would be necessary to rewind the film in order to return the same image to the film gate. This movement of the film through the film gate upon rotation of the film supporting head is quite objectionable because the head is rotated principally for the purpose of erecting an image which is sidewise on the screen and rotation of the head should merely erect the image without moving the same out of the film gate or field of view.

In order to insure that the winding means elements on the head will have more resistance to movement than the winding means elements on the casing, friction drag means are associated with one or more of the winding means elements on the head. For instance, a friction drag member bears on the disk member 110 of the clutch assembly. Such a friction drag member may comprise a friction pad 140 mounted on the end of a plunger 141 which is slidably mounted in the winding means housing 39, see Fig. 5, and which is resiliently urged toward said disk member 110 by a coil spring 142 and threaded plug 143. In a similar manner friction drag members are arranged to engage each of the spindles 47 and 48, only one of which drag members is shown, see Fig. 7. Such a friction drag member comprises a plunger 144, preferably of friction material, a coil spring 145 and a threaded plug 146 screwed into the winding means housing 39. Such friction drag members may be individually adjusted so that even without any film holders on the spindles and without any film being grasped between the gate members, the spindles 47 and 48 will not be turned upon rotation of the film supporting head 12. If it is desired to decrease the winding load to a minimum, such friction drag members may be adjusted so lightly that rotation of the spindles 47 and 48 is not prevented unless there is the additional drag on them created by the frictional engagement of the gate members and intervening film strip F. These friction drag members may also serve another purpose in that they increase the frictional resistance to movement of the winding means elements between the sprocket 79 and the spindles 47 and 48 so that such frictional resistance is considerably greater than the resistance to rocking of the cradle 84 and so that the cradle 84 will surely be rocked to open the gate members before the spindles are rotated.

The normal frictional resistance of the winding means elements particularly on the film supporting head and the additional frictional resistance created by said friction drag members on the winding means elements on the head create a tendency for the entire film supporting head 12 to be rotated by the winding elements means on the casing. For instance, rotation of the pinion gear 83 in mesh with the toothed periphery 94 of the ring member 93 will obviously have a tendency to rotate the entire film supporting head 12. In order to prevent such rotation of the film supporting head 12, a detent means is arranged between said head 12 and the top wall 20 of the casing 11. Such a detent means may comprise a slide 147 slidable on the undersurface of top wall 20, a roller 148 extending through an opening 149 in said top wall 20, and a coil spring 150 fastened at one end to a post 151 on slide 147 and at the other end to a post 152 on top wall 20. Said coil spring 150 acts upon the slide 147 resiliently to hold the roller 148 against the circular flange 36 on the cap-like frame 33 and to move said roller into the semi-circular notches 37 in said flange 36. The film supporting head 12 including cap-like frame 33 may be rotated merely by moving knob 64 so that a semi-circular notch 37 cams the roller 148 therefrom. The notches 37 are located in quadrature so that for each 90° of rotation of the film supporting head 12 the detent means engages another notch 37 and tends to hold the film supporting head in that position. The resilient action of such detent means is sufficient to overcome any tendency of the winding means elements on the casing to rotate the film supporting head 12 when the winding means is operated.

Other advantages of the film handling apparatus disclosed herein will be obvious to those skilled in the art and modification of the various elements disclosed to obtain the same advantages will also be apparent. Therefore, the present disclosure is to be construed only in an illustrative sense and the scope of the invention is defined in the claims which follow.

Having now particularly described my invention what I desire to secure by Letters Patent of the United States and what I claim is:

1. In a film handling apparatus, the combination with a casing including a wall, an objective member having an optical axis and mounted on said wall, a film supporting head provided with an internal annular groove and with an internal cavity for said objective member and carrying a film gate including a stationary gate member and a movable gate member for frictionally engaging and supporting a film strip, a plurality of rollers having peripheries complementary in contour to said groove and supporting said head on said wall for rotation about said optical axis so that a film strip between said gate members is in the focal plane of said objective member; and a winding means including spindles and driven members connected thereto on said head and including a shaft rotatably mounted in said casing and connected to said driven members, an endless drive member on said casing for rotating said shaft, and a winding member on said casing for moving said endless drive member, of a gate opening means including a rockable cradle arranged to be rocked upon movement of said endless drive member and operatively connected to open said movable gate member when said cradle is rocked, friction drag means on said head and engaging an element of the winding means on said head for creating resistance to movement of said winding means elements on the head greater than the resistance to movement of the winding elements on said casing or the resistance to rocking of said cradle, and a detent means between said head and said wall and for positioning said head in one of several predetermined positions and for overcoming the tendency of said winding means to rotate said head.

2. In a film handling apparatus, the combination with a casing including a wall, an objective member having an optical axis and mounted on said wall, a film supporting head provided with an internal annular groove and an internal cavity for said objective member and carrying a film gate including a stationary gate member and a movable gate member for frictionally engaging and supporting a film strip, a plurality of rollers having peripheries complementary in contour to said groove and supporting said head on said wall for rotation about said optical axis and so that a film strip between said gate members is in the focal plane of said objective member, and a winding means including spindles and driven members connected thereto on said head and including a shaft rotatably mounted in said casing and connected to said driven member, an endless drive member on said casing for rotating said shaft, and a winding member on said casing for moving said endless drive member, of a gate opening means including a rockable cradle arranged to be rocked upon movement of said endless drive member and operatively connected to open said movable gate member when said cradle is rocked, and friction drag means on said head and engaging an element of the winding means on said head for creating resistance to movement of said winding means elements on the head greater than the resistance to movement of the winding elements on said casing or the resistance to rocking of said cradle.

3. In a film handling apparatus, the combination with a casing including a wall, an objective member having an optical axis and mounted on said wall, a film supporting head provided with an internal annular groove and an internal cavity for said objective member and carrying a film gate including a stationary gate member and a movable gate member for frictionally engaging and supporting a film strip, a plurality of roller having peripheries complementary in contour to said groove and supporting said head on said wall for rotation about said optical axis and so that the film strip between said gate members is in the focal plane of said objective member, and a winding means including spindles and driven members connected thereto on said head and including a shaft rotatably mounted in said casing and connected to said driven members, an endless drive member on said casing for rotating said shaft, and a winding member on said casing for moving said endless drive member, of a gate opening means including a rockable cradle arranged to be rocked upon movement of said endless drive member and operatively connected to open said movable gate member when said cradle is rocked, and a detent means between said head and said wall and for positioning said head in one of several predetermined positions and for overcoming the tendency of said winding means to rotate said head.

4. In a film handling apparatus, the combination with a casing including a wall, a film supporting head rotatably mounted on said wall and including a film gate, and a winding means comprising a pair of spindles rotatably mounted on said head, a ring member rotatably mounted on said head, driving connections on said head between said ring member and said spindles, a driving member on said casing and engaging the periphery of said ring member to rotate the same, and a winding member on said casing and connected to said driving member, of friction drag means on said head and engaging an element of the winding means thereon for rendering the resistance to movement of the elements of the winding means on said head greater than the resistance to movement of the elements of the winding means on said casing, and a detent means between said head and said wall for positioning said head and for overcoming the tendency of said winding means to rotate said head upon rotation of said ring member by said driving member.

5. In a film handling apparatus, the combination with a casing including a wall, a film supporting head rotatably mounted on said wall and carrying a film gate including a stationary gate member and a movable gate member for frictionally engaging and supporting a film strip, and a winding means including a pair of spindles and driven members connected thereto on said head and including a shaft rotatably mounted in said casing and connected to said driven members, and an endless drive member for rotating said shaft, of a gate opening means including a rockable cradle operatively connected to be rocked upon movement of said endless drive member and operatively associated with the movable gate member so that the same is opened when said cradle is rocked, and friction drag means on said head and engaging an element of the winding means on said head for rendering the resistance to movement of said winding means elements on said head greater than the resistance to movement of the winding elements on said casing and greater than the resistance to rocking of said cradle.

6. In a film handling apparatus, the combination with a pair of spindles for supporting film holders, a film gate including a stationary gate member and a movable gate member for frictionally engaging a film strip extending between said film holders, and a film winding means for rotating said spindles and including a rotatable film winding shaft, a driven member on said shaft, an endless drive member, and a film winding member for moving the same, of a gate opening means comprising a cradle rotatable coaxially upon said film winding shaft for movement of said movable gate member to open position, and a pair of idler supports located and arranged on said cradle for supporting said endless drive member without appreciable slack and in engagement with said driven member and so that said cradle is rocked by movement of said endless drive member.

7. In a film handling apparatus, the combination with a pair of spindles for supporting film holders, a film gate including a stationary gate member and a movable gate member for frictionally engaging a film strip extending between said film holders, and a film winding means for rotating said spindles and including a rotatable shaft, a driven member on said shaft, an endless drive member, and a film winding member for moving the same, of a gate opening means comprising a cradle rotatable on said shaft for movement of said movable gate member to open position, a pair of idler supports located and arranged on said cradle for supporting said endless drive member in engagement with said driven member, and a pair of abutments on said cradle located and arranged to limit rotation of said cradle in either direction, the frictional resistance to movement of said spindles by the film winding means being greater than the resistance to rocking of said cradle so that movement of said film winding member first rocks said cradle and then rotates said spindles.

8. In a film handling apparatus, the combination with a casing including a wall, a film supporting head rotatably mounted on said wall and including a film gate, and a film winding means comprising a pair of spindles rotatably mounted on said head, a ring member rotatably mounted on said head, driving connections on said head between said ring member and said spindles, a driving member on said casing and engaging the periphery of said ring member to rotate the same, and a film winding member on said casing and connected to said driving member, of friction drag means on said head and engaging an element of the film winding means thereon for rendering the resistance to movement of the elements of the film winding means on said head greater than the resistance to movement of the elements of the film winding means on said casing so that said spindles are not rotated and cannot move film through said gate when said head is rotated.

9. In a film handling apparatus, the combination with a casing including a wall, a film supporting head rotatably mounted on said wall and including a pair of spindles for supporting film holders and a film gate for engaging and supporting the film strip between said film holders, and a film winding means for rotating said spindles and comprising a ring member rotatably mounted on said head, driving connection on said head between said ring member and said spindles, a driving member on said casing and engaging the periphery of said ring member to rotate the same, and a film winding member on said casing and connected to said driving member, of a friction drag member on said head and engaging one of said spindles for rendering the resistance to movement of the elements of the film winding means on said head and of said film greater than the resistance to movement of the elements of the film winding means on said casing.

10. In a film handling apparatus, the combination with a casing including a wall, a film supporting head rotatably mounted on said wall and including a pair of spindles for supporting film holders and a film gate for engaging and supporting the film strip between said film holders, and a film winding means for rotating said spindles and comprising a ring member rotatably mounted on said head, a clutch member on said head and connected to said ring member, driving connections between said clutch member and each spindle, a driving member on said casing and engaging the periphery of said ring member to rotate the same, and a film winding member on said casing and connected to said driving member, of a friction drag member on said head and engaging said clutch member for rendering the resistance to movement of the film winding means elements on said head greater than the resistance to movement of the film winding means elements on said casing.

11. In a film handling apparatus, the combination with a casing including a wall, a film supporting head rotatably mounted on said wall and including a pair of spindles for supporting film holders and a film gate for engaging and supporting the film strip between said film holders, and a film winding means for rotating said spindles and comprising a ring member rotatably mounted on said head, a clutch member on said head and connected to said ring member, driving connections between said clutch member and each spindle, a driving member on said casing and engaging the periphery of said ring member to rotate the same, and a film winding member on said casing and connected to said driving member, of a plurality of friction drag members on said head and respectively engaging said clutch member and each of said spindles for rendering the resistance to movement of the film and film winding means elements on said head greater than the resistance to movements of the film winding means elements on said casing so that upon rotation of said head the film winding means elements on the casing are moved and the film and film winding means elements on said head are not moved with respect to said head.

12. In a film handling apparatus, the combination with a casing including a wall, an objective member mounted on said wall, a film supporting head having a circular flange and provided with an internal annular groove, and carrying a pair of spindles for supporting film holders and a film gate with a film contacting surface, and a plurality of rollers having peripheries complementary in contour to said groove and for rotatably supporting said head on said wall with said film contacting surface accurately positioned with respect to the focal plane of said objective member, of a winding means for rotating said spindles, including a ring member rotatably mounted on said head, and including a driving member on said casing for engaging and rotating the periphery of said ring member, and a spring pressed roller on said wall for engaging notches in said circular flange of the film supporting head and for preventing rotation thereof upon operation of said winding means and rotation of said ring member by said driving member.

13. In a film handling apparatus, the combination with a casing including a wall, and a film supporting head provided with an internal cavity and an annular groove, of a bellcrank centrally pivoted on said wall, a plurality of rollers having peripheries complementary in contour to the contour of said groove, some of which rollers are rotatably mounted upon said wall for engagement with said groove and one of which rollers is rotatably mounted on one end of said bellcrank, and a resilient means between said casing and said bellcrank for urging the roller on said bellcrank into resilient engagement with said groove.

14. In a film handling apparatus, the combination with a casing including a wall, an objective member mounted on said wall, and a film supporting head including a film gate with a film contacting surface and provided with a V-shaped circular groove, of a plurality of rollers having V-shaped peripheries and rotatably mounted on said wall to engage said groove and rotatably to support said head with the film contacting surface of said film gate accurately located so that a film engaging the same is in the focal plane of said objective member.

15. In a film handling apparatus, the combination with a casing including a wall, an objective member mounted on said wall, and a film supporting head including a film gate with a film contacting surface and provided with an internal cavity for said objective member and provided with an internal V-shaped circular groove, of a bellcrank centrally pivoted on said wall, a plurality of rollers having V-shaped peripheries, some of which rollers are rotatably mounted upon said wall for engagement with said groove and one of which rollers is rotatably mounted on one end of said bellcrank, and a spring member having one end connected to said casing and the other end connected to the other end of said bellcrank to press the roller thereon into said groove and accurately locate the film contacting surface of said film gate with respect to the focal plane of said objective member.

16. In a film handling apparatus, the combination with a casing including a wall, a film supporting head including a pair of spindles for supporting film holders and a film gate for supporting the film therebetween, and mounting means on said wall for rotatably supporting said head thereon, of a film winding means for rotating said spindles including a ring member rotatably mounted on said head and a driving member on said casing for engaging and rotating said ring member, and detent means between said head and said wall for positioning said head in any one of a plurality of positions with respect to said casing and for overcoming the tendency of said film winding means to rotate said head upon rotation of said ring member by said driving member.

17. In a film handling apparatus, the combination with a casing including a wall, a film supporting head carrying a pair of spindles for supporting film holders and a film gate for supporting a film strip and including a circular flange provided with notches located in quadrature, and mounting means on said wall for rotatably supporting said head thereon, of a winding means for rotating said spindles, including a ring gear having peripheral teeth and rotatably mounted on said head, and including a pinion gear rotatable on said wall and engaging the teeth of said ring gear to rotate the same when said winding means is operated, and a roller on said wall and spring pressed against the circular flange on said head and into one of the notches of said flange to position said head and prevent rotation thereof upon operation of said winding means.

18. In a film handling apparatus, the combination with a casing including a wall, an objective member mounted on said casing and having an optical axis extending transversely of said wall, a film supporting head including a pair of spindles for supporting film holders and a film gate for supporting the film between the film holders in the field of said objective, and a mounting means on said casing and supporting said head for rotation about the axis of said objective member, of a film winding means for rotating said spindles, including a driven member mounted on said head for rotation about an axis extending transversely of said wall and operatively connected to said spindles, and including a driving member on said casing for engaging and rotating said driven member on said head and a film winding member on said casing and operatively connected to said driving member.

19. In a film handling apparatus, the combination with a casing including a wall, an objective having an optical axis and mounted on said wall, a film supporting head including a pair of spindles for supporting film holders, and a mounting means on said casing and supporting said head for rotation about the axis of said objective member, of a film winding means for rotating said spindles, including a driven member mounted on said head also for rotation about said axis and operatively connected to said spindles, and including a driving member on said casing for engaging and rotating said driven member on said head and a film winding member on said casing operatively connected to said driving member.

20. In a film handling apparatus, the combination with a casing including a wall, an objective having an optical axis and mounted on said wall, a film supporting head including a pair of spindles for supporting film holders, and a mounting means on said casing and supporting said head for rotation about the axis of said objective member, of a film winding means for rotating said spindles, including a ring member having a toothed periphery and mounted on said head also for rotation about said axis and operatively connected to rotate said spindles, and including a pinion gear on said wall for engaging the toothed periphery of said ring member and for rotating the same, and a film winding member also on said casing operatively connected to said driving member.

ROY S. HOPKINS.